United States Patent
Schmidt et al.

(10) Patent No.: US 7,691,797 B2
(45) Date of Patent: Apr. 6, 2010

(54) CONTROLLED RADICAL ACRYLIC COPOLYMER THICKENERS

(75) Inventors: Scott Charles Schmidt, West Chester, PA (US); Peter Anthony Callais, Collegeville, PA (US); Noah Eliot Macy, Royersford, PA (US); Olivier Guerrett, La Tour de Salvagny (FR)

(73) Assignee: Arkema Inc., Philadelphia, PA (US)

(*) Notice: Subject to any disclaimer, the term of this patent is extended or adjusted under 35 U.S.C. 154(b) by 985 days.

(21) Appl. No.: 10/578,060

(22) PCT Filed: Oct. 15, 2004

(86) PCT No.: PCT/US2004/034236

§ 371 (c)(1),
(2), (4) Date: May 2, 2006

(87) PCT Pub. No.: WO2005/056739

PCT Pub. Date: Jun. 23, 2005

(65) Prior Publication Data

US 2007/0082827 A1    Apr. 12, 2007

Related U.S. Application Data

(60) Provisional application No. 60/525,549, filed on Nov. 26, 2003.

(51) Int. Cl.
*C10M 145/16* (2006.01)
*C10M 145/14* (2006.01)
*C08F 8/14* (2006.01)
*C10L 1/22* (2006.01)

(52) U.S. Cl. .......... 508/469; 508/468; 508/470
(58) Field of Classification Search ........... 508/469, 508/468, 470
See application file for complete search history.

(56) References Cited

U.S. PATENT DOCUMENTS

| 4,537,696 | A | * | 8/1985 | Beimesch ............. 252/75 |
| 4,756,843 | A | | 7/1988 | Jarrin et al. |
| 5,002,676 | A | | 3/1991 | Willis et al. |
| 5,272,211 | A | | 12/1993 | Sutherland et al. |
| 5,955,405 | A | * | 9/1999 | Liesen et al. ........... 508/469 |
| 6,034,042 | A | | 3/2000 | Rhodes |
| 6,124,249 | A | | 9/2000 | Seebauer et al. |
| 6,255,402 | B1 | | 7/2001 | Boutillier et al. |
| 6,255,448 | B1 | | 7/2001 | Grimaldi et al. |
| 6,271,184 | B1 | | 8/2001 | Seebauer et al. |
| 6,281,311 | B1 | * | 8/2001 | Lai et al. ........... 526/220 |
| 6,303,550 | B1 | | 10/2001 | Wedlock et al. |

(Continued)

OTHER PUBLICATIONS

Ananchenko, G., et al., Journal of Polymer Science: Part A: Polymer Chemistry, "Decomposition of Model Alkaxyamines in Simple and Polymerizing Systems," 2002, vol. 40, pp. 3264-3283.

(Continued)

*Primary Examiner*—Walter D Griffin
*Assistant Examiner*—Frank C Campanell
(74) *Attorney, Agent, or Firm*—Steven D. Boyd (57) ABSTRACT

The present invention relates to acrylic block copolymers synthesized by a controlled radical process, and their use as thickeners in oil-based compositions. The acrylic copolymers are especially useful as viscosity index improvers in lubricating oil.

36 Claims, 2 Drawing Sheets

U.S. PATENT DOCUMENTS

| | | |
|---|---|---|
| 6,319,881 B1 | 11/2001 | Coolbaugh et al. |
| 6,350,723 B1 | 2/2002 | Mishra et al. |
| 6,391,996 B1 | 5/2002 | Scherer et al. |
| 6,403,745 B1 | 6/2002 | Scherer et al. |
| 6,531,547 B1 | 3/2003 | Visger et al. |
| 6,538,091 B1 | 3/2003 | Matyjaszewski et al. |
| 6,610,802 B2 | 8/2003 | Roos et al. |
| 6,617,397 B2 | 9/2003 | McNamara et al. |
| 6,624,322 B1 | 9/2003 | Gillet et al. |
| 6,657,043 B1 | 12/2003 | Guerret et al. |
| 2002/0040117 A1 | 4/2002 | Guerret et al. |
| 2002/0188081 A1 | 12/2002 | Roos et al. |
| 2003/0073785 A1 | 4/2003 | Okada et al. |

OTHER PUBLICATIONS

Gruike, E. A., Polymer Handbook, "Solubility Parameter Values," Fourth Edition, 1999, John Wiley & Sons, Inc., pp. VII/675-VII/711.

Matyjaszewski, K., ACS Symposium, Controlled/Living Radical Polymers, "Progress in ATRP, NMP, and RAFT," American Chemical Society, 2000, pp. 1-26.

Goto, A., et al, Macromolecules, Kinetic Study on Nitroxide-Mediated Free Radical Polymerization of tert-Butyl Acrylate, American Chemical Society, 1999, 32, pp. 618-623.

Benoit, D., et al, "Controlled Free—Radical Polymerization in the Presence of a Novel Asymmetric Nitroxyl Radical," Polym. Prep., 1997, 38, pp. 729-730.

Hawker, C., et al, "Development of a Universal Alkoyamine for Living Free Radical Polymerizations Using Combinatorial Techniques," Polymer Material Science Engineering, 1999, 80, pp. 90-91.

Hawker, C., et al, "Initiating Systems for Nitroxide-Mediated "Living" Free Radical Polymerizations: Synthesis and Evaluation," Macromolecules, vol. 29, No. 19, Jul. 29, 1996, pp. 5245-5254.

Greszta, D., et al, "Mechanism of Controlled/"Living" Radical Polymerization of Styrene in the Presence of Nitroxyl Radicals. Kinetics and Simulations," Macromolecules, 1996, 29, pp. 7661-7670.

* cited by examiner

CONTROLLED RADICAL ACRYLIC COPOLYMER THICKENERS

REFERENCE TO RELATED APPLICATION

This application claims the benefit of U.S. Provisional Application Ser. No. 60/525,549, filed Nov. 26, 2003.

FIELD OF THE INVENTION

The present invention relates to acrylic block copolymers synthesized by a controlled radical process and their use as additives and thickeners in oil-based compositions. They are especially useful as viscosity index improvers in lubricating oil.

BACKGROUND OF THE INVENTION

Lubricating oils, such as motor oils, gear oils, hydraulic fluids and transmission fluids typically contain several additives to improve their performance. These can include dispersants, antioxidants, detergents, friction modifiers, de-foaming agents, pour point depressants, and viscosity index improvers.

The viscosities of lubricating oils are temperature dependent, thus as the temperature of the oil is increased the viscosity typically decreases, and conversely as the temperature of an oil decreases the viscosity will increase. A significant loss of viscosity can be detrimental as it may cause wear between engine parts it is designed to protect. A viscosity index improver (VII) is typically a polymeric material, which principally functions by minimizing the viscosity variations over a wide range of temperatures. Normally these are used to reduce the viscosity loss of lubricating oils upon heating.

Random copolymers are commonly used as VIIs. To ensure solubility in a lubricating oil base, these copolymers are formed from at least one monomer whose homopolymer is oil-soluble. Three types of random copolymers commonly used as VIIs are: polymethacrylates (U.S. Pat. No. 6,124,249), olefinic copolymers (US 2003/0073785), and conjugated dienes (U.S. Pat. No. 6,319,881).

Polymers having a controlled architecture, including star copolymers (U.S. Pat. No. 6,034,042) and block copolymers have been described in the art. These polymers can be prepared through a variety of living anionic and living (or controlled) free radical polymerization techniques. These techniques have been used primarily to control the molecular weight distribution.

U.S. Pat. No. 6,538,091 describes a process for the control of a polymer architecture using an atom transfer process (ATRP) based on a redox reaction with a transition metal compound. This process uses an initiating system resulting in a copolymer having a predictable molecular weight and a controlled polydispersity. Polymers made by the process are described as useful for molding materials, barrier materials, thermoplastic elastomers, and amphiphilic surfactants. This controlled radical polymerization technique has several drawbacks such as, residual metallic by-products which can be detrimental to many applications (for example see U.S. Pat. No. 6,610,802) and limitations in polymer composition. Furthermore, the reference does not describe the use of any of the copolymers in lubricating oils.

Random copolymers made by ATRP have been used as pour point depressants (U.S. Pat. No. 6,391,996), and viscosity index improvers (US2002/0188081). The '081 reference mentions that the ATRP process could be used for blocky copolymers, but fails to exemplify such a use, or recognize the large VII benefit of using such block copolymers in lubricating oils. Also, gradient copolymers synthesized by ATRP have been shown useful as pour point depressants in U.S. Pat. No. 6,403,745. Again, the use of relatively high catalytic amounts of metal compounds leads to product containing residual metal contamination. These metallic by-products are detrimental in engine-type lubricant applications and require removal, which is difficult and requires laborious procedures.

The use of multifunctional lubricant additives has been described in U.S. Pat. No. 6,319,881.

Block copolymers have also been shown to be useful as VIIs. Block copolymers of a vinyl aromatic monomer and a vinyl aromatic-co-acrylic block prepared by stabilized free radical polymerization are described in U.S. Pat. No. 6,531,547. These patents describe the use of TEMPO-based nitroxide derivatives for the synthesis of the corresponding block copolymers. This class of free radical control agent does not provide control over acrylic type monomers. Specifically, the use of methacrylics will lead to side and termination reactions such as disproportionation, which inhibits the formation of block copolymers and long chain molecules (as described by Ananchenko et. al. in the *Journal of Polymer Science: Part A: Polymer Chemistry*, Vol. 40 pp 3264-3283). Also, block copolymers of ethylene and alpha-olefins have been described in US 2003/0073785 and block copolymers of poly (conjugated dienes) and poly(monovinyl aromatic hydrocarbons have been described in U.S. Pat. No. 6,303,550. None of the above references makes use of a controlled architecture copolymer having at least one pure acrylic block segment for use as a VII.

U.S. Pat. No. 5,002,676 describes the preparation of block copolymers containing selectively hydrogenated conjugated dienes and t-butyl methacrylate. U.S. Pat. No. 6,350,723 teaches the synthesis of block copolymers through the living anionic polymerization of a conjugated diene and an alkyl methacylate monomer. These references exemplify the use of block copolymers containing conjugated dienes and hydrogenated dienes, but fail to teach the specific copolymers of the present invention. Also these references do not teach the significance of tailoring block solubilities or allow for the formation of gradient compositions. Furthermore, living anionic polymerization suffers from several drawbacks, such as, ineffectiveness at temperatures above −20° C., poor copolymerization between polar and non-polar comonomers, and the inability to use monomers that can be easily deprotonated. Therefore functional monomers cannot be incorporated, and the copolymerization of monomer mixtures can be problematic and/or unusable. Furthermore this process can be expensive and difficult or impractical to carry out on an industrial scale as bulk or emulsion techniques cannot be used, extremely pure reagents are necessary (even trace amounts of protic material inhibits polymerization), and an inert atmosphere is requisite.

A process for preparing copolymers in the presence of a stable free radical from the nitroxide family is described in U.S. Pat. No. 6,255,402. Nitroxide-mediated stable radicals have been used to produce controlled block copolymers, as described in U.S. Pat. No. 6,255,448, and US 2002/0040117. These references, incorporated herein by reference, do not describe the use of the copolymers in lubricating oils.

Surprisingly it has now been found that an acrylic block copolymer formed by a controlled radical polymerization, produces excellent viscosity index improvement in lubricating oils. The polymers of the invention produce a greater VI improvement than found in random copolymers or other block copolymers currently used. While the properties attained in traditional copolymers are typically an average of the properties imparted by the resultant monomers incorporated, block copolymers lead to a material containing the characteristic properties inherent to the parent homopolymers comprising each segment. Therefore, the use of block copolymers is particularly adventitious for the formation of materials containing multifunctional properties. Furthermore, this class of polymers should provide enhanced shear stability due to the selected monomer composition, the controlled molecular weights, and molecular weight distribution provided by the controlled polymerization process. The viscosity modifying advantages of these copolymers for lubricant oil applications can be exemplified by the excellent performance demonstrated in typical SAE Standard J300 viscosity classification testing and ASTM D 2270 testing. Furthermore these block copolymers can be used to thicken any number of oil-based compositions.

SUMMARY OF THE INVENTION

It is an objective of the invention to provide a controlled-architecture copolymer capable of thickening oil-based compositions.

Another objective of the invention is to provide a lubricating oil with good viscosity index improvement by utilizing an acrylic block copolymer synthesized by controlled radical polymerization.

It is a further objective of the invention to adjust the copolymer composition and physical properties of an acrylic block copolymers synthesized by controlled radical polymerization for the optimal viscosity index improvement in a given lubricating oil.

It is also an objective of the invention to synthesize an acrylic block copolymer by a nitroxide-mediated polymerization process.

These objectives have been met in a thickened oil composition comprising:
a) from 99.999 to 60.0 weight percent of one or more oils, and
b) from 0.001 to 40.0 weight percent of a controlled architecture block copolymer having at least one acrylic block.

DETAILED DESCRIPTION OF THE INVENTION

The present invention is directed to oil-based compositions containing a controlled architecture block copolymer having at least one acrylic block. Preferably the block copolymer is amphiphilic. The term amphiphilic is meant to describe a block copolymer in which at least one block segment is readily soluble in an oil, and one segment is partially or completely insoluble in the oil. The amphiphilic nature will of course be dependant on the nature of the oil. The specific composition of the corresponding block copolymers can be tailored accordingly based on the base oil utilized, to attain the desired amphiphilic behavior.

The Hildebrand solubility parameter can be used as a useful guide to determine the solubility of polymers in a specific medium. A detailed summary of this parameter is provided in the chapter entitled "Solubility Parameter Values", by E. A. Grulke in the *Polymer Handbook*, Fourth Edition, ed. J. Brandrup, E. J. Immergut, and E. A. Grulke, John Wiley & Sons, New York, 1999. Although the solubility parameters best describe nonpolar solvents, they have been extended to include both polar solvents and polymeric materials as described in the *Polymer Handbook*, page VII/677. The solubility parameter of numerous commercial polymers as well as methods (both experimental and theoretical) for estimating the solubility parameter is also contained in the above stated reference. While the solubility of a particular polymer in a lubricating oil will be dependant on factors such as molecular weight, temperature, and so forth, it is frequently found that polymers will dissolve in solvents having solubility parameters within about 1 to 1.5 units of their own (based on solubility parameters given in $(J/m^3)^{1/2}$. In order to definitively assess the solubility of a polymer segment in an oil, the corresponding homopolymer must be directly tested.

The compatibility of each segment can be estimated using Hildebrand solubility parameters. The oil-soluble block typically has a solubility parameter within 2.0 $(J/m^3)^{1/2}$ of the selected lubricating oil, preferably within 1.5 $(J/m^3)^{1/2}$; and the oil-insoluble block has a solubility difference of greater than 1.5 $(J/m^3)^{1/2}$, and preferably greater than 2.0 $(J/m^3)^{1/2}$. Block copolymer compositions in which both segments are soluble in oil can be used, however this minimizes the ability to form micelles or aggregates which can provide beneficial attributes to the system.

The block copolymers of the present invention find use, among other things, as thickeners or viscosity modifiers of oil-based formulations. Oils useful in the invention include, but are not limited to, mineral oils, synthetic oils, silicon oils, and lubricating oils. In one preferred case, these block copolymers may be solubilized in base oils to form a lubricating oil composition. The oil makes up from 60 to 99.999 percent by weight of the oil composition, preferably from 80 to 99.99 percent.

Typical paraffinic lubricating oils have a solubility parameter of about 16 $(J/m^3)^{1/2}$, however the solubility parameter will fluctuate, depending on the napthelenic content along with other factors. Therefore, a "soluble" polymer block may be one with a solubility parameter of roughly 14-18 $(J/m^3)^{1/2}$. Examples of oil-compatible blocks that have a solubility parameter very similar to paraffinic oil include, but are not limited to polymers of dodecyl methacrylate, mixtures of $C_{16}$ to $C_{22}$ methacrylates, $C_6$ to $C_{30}$ linear or branched acrylates, methacrylates and mixtures thereof. The oil insoluble blocks can be formed from one or more monomers resulting in a segment of desired solubility.

Examples of polymer blocks insoluble in paraffinic oil include, but are not limited to those formed from methyl acrylate, methyl methacrylate, polystyrene, methoxyethyl acrylate, polyethylene glycol methylether acrylate and methacrylate, $C_1$ to $C_3$ methacrylates, $C_1$ to $C_4$ linear and branched acrylates, and mixtures thereof. A monomer forming an oil-soluble polymer can be copolymerized with a monomer forming an oil-soluble polymer in such a ratio that the resultant block segment is insoluble. It has been found that polymer blocks containing polymers having a solubility parameter of 19 $(J/m^3)^{1/2}$ or greater can be synthesized and exhibit exceptional viscosity index improvement when used in the present invention.

By "copolymers" as used herein, is meant polymers formed from at least two chemically distinct monomers. Copolymers includes terpolymers and those polymers formed from more than three monomers. Each block segment may consist of a homopolymer, or may be a copolymer of two or more different monomers.

Block copolymers of the present invention are those formed by a controlled radical polymerization (CRP). They differ from random copolymers that may contain some blocks of certain monomers related either to a statistical distribution, or to the differences in reaction rates between the monomers. In these random polymerizations, there is virtually no control over the polymer architecture, molecular weight, or polydispersity and the relative composition of the individual polymer chains is non-uniform. Included as block copolymers of the present invention are diblock copolymers, triblock copolymers, multiblock copolymers, star polymers, comb polymers, gradient polymers, and other polymers having a blocky structure, which will be known by those skilled in the art.

When a copolymer segment is synthesized using a CRP technique such as nitroxide-mediated polymerization, it is termed a gradient or 'profiled' copolymer. This type of copolymer is different than a polymer obtained by a traditional free radical process and will be dependant on the monomer composition, control agent, and polymerization conditions. For example, when polymerizing a monomer mix by traditional free radical polymerizations, a statistical copolymer is produced, as the composition of the monomer mix remains static over the lifetime of the growing chain (approximately 1 second). Furthermore, due to the constant production of free radicals throughout the reaction, the composition of the chains will be non-uniform. During a controlled radical polymerization the chains remain active throughout the polymerization, thus the composition is uniform and is dependant on the corresponding monomer mix with respect to the reaction time. Thus in a two monomer system where one monomer reacts faster than the other, the distribution or 'profile' of the monomer units will be such that one monomer unit is higher in concentration at one end of the polymer segment.

The copolymers of the invention are acrylic block copolymers. By acrylic block copolymer, as used herein, is meant that at least one block of the copolymer is formed entirely or almost entirely from one or more acrylic monomers. The acrylic block contains at least 90 mole percent of acrylic monomer units, preferably at least 95 mole percent, and most preferably at least 98 mole percent. In one preferred embodiment, the acrylic block contains 100 percent acrylic monomer units. The other block or blocks may be acrylic or non-acrylic.

By "acrylic" as used herein is meant polymers or copolymers formed from acrylic monomers including, but not limited to, acrylic acids, esters of acrylic acids, acrylic amides, and acrylonitiles. It also includes alkacryl derivatives, and especially methacryl derivatives. Functional acrylic monomers are also included. Examples of useful acrylic monomers include, but are not limited to acrylic acid; methacrylic acid; alkyl esters and mixed esters of (meth)acrylic acid; acrylamide, methacrylamide, N- and N,N-substituted (meth)acrylamides, acrylonitrile, maleic acid, fumaric acid, crotonic acid, itaconic acid and their corresponding anhydrides, carbonyl halides, amides, amidic acids, amidic esters, and the full and partial esters thereof. Especially preferred acrylic monomers include methyl acrylate, ethyl acrylate, butyl acrylate, and $C_8$-$C_{22}$ alkyl(meth)acrylates, and mixtures thereof.

The other block or blocks of the copolymer may be acrylic, or formed from one or more non-acrylic ethylenically unsaturated monomers. In one preferred embodiment all blocks of the copolymer are acrylic blocks. Other ethylenically unsaturated monomers useful in the invention include, but are not limited to, anhydrides, vinyl esters, alpha-olefins, substituted or unsubstituted mono and dialkyl esters of unsaturated dicarboxylic acids, vinyl aromatics, cyclic monomers, monomers containing alkoxylated side chains, sulfonated monomers, and vinyl amide monomers. Acrylic monomers may also be used at any level. A combination of ethylenically unsaturated monomers may also be used. A preferred non-acrylic monomer is styrene.

In principle, any living or controlled polymerization technique can be utilized. However, for the practicality of controlling acrylics, and creating copolymer segments of different polarities (including functional acrylics) the block copolymers of the present invention are preferably formed by controlled radical polymerization (CRP).

These processes generally combine a typical free-radical initiator with a free radical stabilizing compound to control the polymerization process and produce polymers of a specific composition, and having a controlled molecular weight and narrow molecular weight range. The free-radical initiators used may be those known in the art, including, but not limited to peroxy compounds, peroxides, hydroperoxides and azo compounds which decompose thermally to provide free radicals.

Examples of controlled radical polymerization techniques will be evident to those skilled in the art, and include, but are not limited to, atom transfer radical polymerization (ATRP), reversible addition fragmentation chain transfer polymerization (RAFT), nitroxide-mediated polymerization (NMP), boron-mediated polymerization, and catalytic chain transfer polymerization (CCT). Descriptions and comparisons of these types of polymerizations are described in the ACS Symposium Series 768 entitled *Controlled/Living Radical Polymerization: Progress in ATRP, AMP, and RAFT*, edited by Krzystof Matyjaszewski, American Chemical Society, Washington, D.C., 2000.

One preferred method of controlled radical polymerization is nitroxide-mediated CRP. Nitroxide-mediated polymerization can occur in bulk, solvent, and aqueous polymerization, can be used in existing equipment at reaction times and temperature similar to other free radical polymerizations. One advantage of nitroxide-mediated CRP is that the nitroxide is generally innocuous and can remain in the reaction mix, while other CRP techniques require the removal of the control compounds from the final polymer.

The mechanism for this control may be represented diagrammatically as below:

with M representing a polymerizable monomer and P representing the growing polymer chain.

The key to the control is associated with the constants $K_{deact}$, $k_{act}$ and $k_p$ (T. Fukuda and A. Goto, Macromolecules 1999, 32, pages 618 to 623). If the ratio $k_{deact}/k_{act}$ is too high, the polymerization is blocked, whereas when the ratio $k_p/k_{deact}$ is too high or when the ratio $k_{deact}/k_{act}$ is too low though, the polymerization is uncontrolled.

It has been found (P. Tordo et al., Polym. Prep. 1997, 38, pages 729 and 730; and C. J. Hawker et al., Polym. mater. Sci. Eng., 1999, 80, pages 90 and 91) that β-substituted alkoxyamines make it possible to initiate and control efficiently the polymerization of several types of monomers, whereas TEMPO-based alkoxyamines [such as (2',2',6',6'-tetramethyl-1'-piperidyloxy-)methylbenzene mentioned in Macromolecules 1996, 29, pages 5245-5254] control only the polymerizations of styrene and styrenic derivatives. TEMPO and TEMPO-based alkoxyamines are not suited to the controlled polymerization of acrylics.

The nitroxide-mediated CRP process is described in, U.S. Pat. No. 6,255,448, US 2002/0040117 and U.S. Pat. No. 6,657,043, incorporated herein by reference. The above-stated patents describe the nitroxide-mediated polymerization by a variety of processes. Each of these processes can be used to synthesize polymers described in the present invention.

In one process the free radical polymerization or copolymerization is carried-out under the usual conditions for the monomer or monomers under consideration, as known to those skilled in the art, with the difference being that a β-substituted stable free radical is added to the mixture. Depending on the monomer or monomers which it is desired to polymerize, it may be necessary to introduce a traditional free radical initiator into the polymerization mixture as will be evident to those skilled in the art.

Another process describes the polymerization of the monomer or monomers under consideration using a alkoxyamine obtained from β-substituted nitroxides of formula (I) wherein A represents a mono- or polyvalent structure and $R_L$ represents a mole weight of more than 15 and is a monovalent radical, and $n \geq 1$.

(I)

Another process describes the formation of polyvalent alkoxyamines of formula (I), based on the reaction of multi-functional monomers, such as, but not limited to, acrylate monomers and alkoxyamines at controlled temperatures. The multifunctional alkoxyamines of formula (I), wherein $n \geq 2$, may then be utilized to synthesize star and branched polymeric and copolymeric materials from the monomer or monomers under consideration.

Another process describes the preparation of multimodal polymers where at least one of the monomers under consideration is subjected to free radical polymerization in the presence of several alkoxyamines comprising the sequence of formula (I), wherein n is a non-zero integer and the alkoxyamines exhibit different values of n.

The alkoxyamines and nitroxyls (which nitroxyls may also be prepared by known methods separately from the corresponding alkoxyamine) as described above are well known in the art Their synthesis is described for example in U.S. Pat. No. 6,255,448 and U.S. Pat. No. 6,624,322.

The polyalkoxyamines of formula (I) may be prepared according to methods known in the literature. The method most commonly used involves the coupling of a carbon-based radical with a nitroxide radical. The coupling may be performed using a halo derivative $A(X)_n$ in the presence of an organometallic system, for instance CuX/ligand (X═Cl or Br) according to a reaction of ATRA (Atom Transfer Radical Addition) type as described by D. Greszta et al. in Macromolecules 1996, 29, 7661-7670. A preferred ligand is —N,N,N', N',N"-pentamethyldiethylenetriamine (PMDETA):

(II)

The alkoxyamines of formula (I) according to the present invention may be used for the polymerization and copolymerization of any monomer containing a carbon-carbon double bond, which is capable of undergoing free-radical polymerization. The polymerization or copolymerization is performed under the usual conditions known to those skilled in the art, taking into account the monomer(s) under consideration. Thus, the polymerization or copolymerization may be performed in bulk, in solution, in emulsion or in suspension, at temperatures ranging from 0° C. to 250° C. and preferably ranging from 25° C. to 150° C., without any limitation intended by this. Monomers which may be used according to the present invention, include but are not limited to: vinylaromatic monomers such as styrene, substituted styrenes, dienes, acrylic monomers such as alkyl or aryl acrylates and methacrylates, optionally containing fluorine. For example, methyl acrylate, butyl acrylate or methyl methacrylate, and acrylamides such as N,N-dimethylacrylamide. This method of the present invention works well for styrenics, acrylates, acrylamides, methacrylates and dienes. Functional monomers, such as epoxy, hydroxy and acid monomers are also easily polymerized by this method.

The alkoxyamines (I) according to the present invention may also be used for the synthesis of "sequenced" block copolymers according to a procedure which consists in carrying out, in a first step, the bulk, solution, suspension or emulsion polymerization of a monomer M1 or a mixture of monomers containing a carbon-carbon double bond capable of undergoing free-radical polymerization in the presence of a alkoxyamine (I) at a temperature ranging from 25° C. to 250° C. and preferably ranging from 25° C. to 150° C., and then, in a second step, allowing the temperature to fall and optionally evaporating off the residual monomer(s), and then, in a third step, in introducing the monomer M2 or a new mixture of monomers into the reaction medium obtained above, and then resuming the polymerization by simply raising the temperature.

Polymers made by the nitroxide-mediated process will have nitroxide end groups and the A group from Formula I at the other end or in the center of the corresponding block. These relatively innocuous nitroxide end-groups can remain on the end of the polymer chains or be removed by an additional processing step.

The nitroxide-mediated polymerization may be used to form block copolymers, which of the present invention are diblock copolymers, triblock copolymers, multiblock copolymers, star polymers, comb polymers, gradient polymers, and other polymers having a blocky structure, which will be known by those skilled in the art. The multiblock and triblock copolymers may consist of two chemically discrete segments, such as in A-B-A triblocks or multiblocks of the formula $(A-B)_n$, where n is >1 and A and B represent chemically distinct block segments. Or they may contain 3 or more chemically distinct blocks, such as A-B-C triblocks or A-B-C-D multiblock copolymers. The star polymers may contain from 3 to 12 arms, more preferably 3 to 8 and these arms may consist of or diblock, triblock, or multiblock copolymers. These aforementioned structures will be evident to those skilled in the art. Each block segment defined above may consist of a homopolymer, a random copolymer or may be comprised as a gradient copolymer of two or more different monomers.

The block copolymers of the present invention have a controlled molecular weight and molecular weight distribution. Preferably the molecular weight of the copolymer is from 1,000 to 1,000,000 g/mol, and most preferably from 5,000 to 300,000 g/mol. The molecular weight distribution, as measured by $M_w/M_n$ or polydispersity is generally less than 4.0, and preferably below 3.0.

One embodiment of the invention is a thickened lubricating oil composition. Uses of such lubricating oils include, but are not limited to motor oils, gear oils, pump oils, turbine oils, hydraulic fluids, cutting fluids and transmission fluids. The block copolymers may be used independently, or as a blend with traditional polymers. In the lubricating oil composition, a variety of additives may also be present in addition the base oil and polymers mentioned above, including but not limited to detergents, anti-foaming agents, pour point depressants, and anti-corrosion agents.

Due to the control over molecular weight and narrow molecular weight distribution, these polymers exhibit enhanced shear stability. The amphiphilic nature of the block copolymers will allow for the addition of dispersancy to the lubricating oil composition. It is expected, the incorporation of functional monomers, including but not limited to, dimethyl amino ethylacrylate, vinyl pyrrolidone, and dimethylacrylamide will further enhance the dispersant nature of these block copolymers.

The block copolymer is present in a lubricating oil composition at from 0.001 to 40.0 percent by weight, and preferably from 0.01 to 20.0. The level of copolymer used depends on the SAE viscosity grade desired, and the base oils used. One of skill in the art can optimize the SAE grade dependent on the blend of base oils, and the level of copolymer added. Excellent VI improvement has been found using the acrylic copolymers of the present invention. Because of the large VI improvement of these copolymers, oils having a higher VI can be formulated at similar copolymer levels to those currently used, or VI improvement similar to that of currently used VIIs can be achieved at lower levels of the copolymer of the invention. While not being bound by any particular theory, it is believed that the blocky nature of the present copolymers leads to the higher VI improvement.

The lubricating oils of the present invention can be optimized based on several characteristics of the copolymers. These characteristics were tested in Example 3 with the data shown in Table 1. It was found that the total molecular weight of the block copolymer and the composition (i.e, solubility parameter) of the oil-insoluble block had the greatest effect on the VI improvement. Also important was the interaction between the molecular weight and the composition. The weight percent of the insoluble block also had a noticeable effect on the VI. The VI was found to increase as the total Mn increased from 20,000 to 50,000. Changing the insoluble block from polystyrene (a solubility parameter of 18.4 $(J/m^3)^{1/2}$ to a poly methyl acrylate block (a solubility parameter of 20.4 $(J/m^3)^{1/2}$ also increased the VI. An increase in the weight percentage of the insoluble block also led to an increase in VI.

Additionally it was found that there was a correlation between the solubility parameter in the insoluble segment and VI improvement, i.e., the larger the difference in solubility parameter, the greater the effect in the VI improvement.

It is anticipated that the resultant amphiphilic character of these materials may also lead to ordered structures such as micelles, which may impart unique properties to the system.

Figure 1:
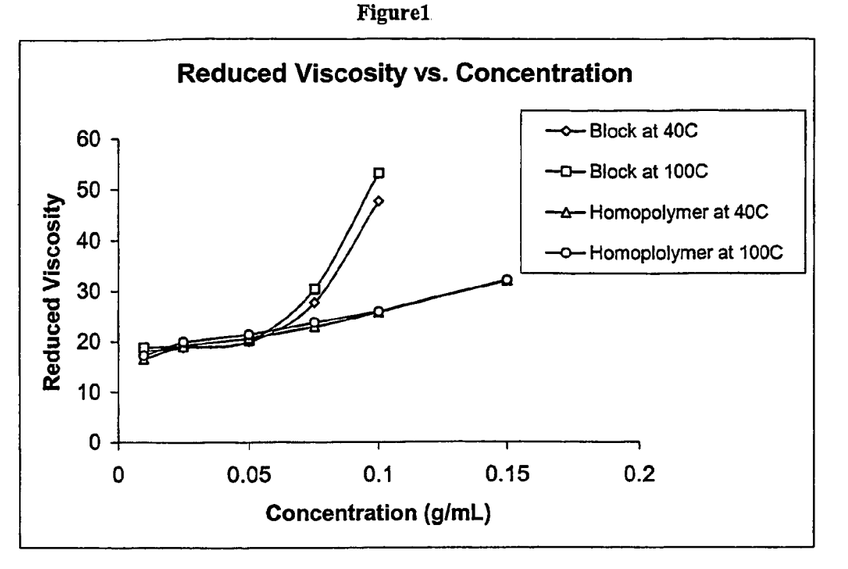
FIG. 1 graphically illustrates the reduced viscosity versus the concentration of lubricating oils containing comparative VIIs and block copolymer VIIs of the invention. The plot shows that the comparative VIIs show a linear increase in reduced viscosity with increased concentration, while the VIIs of the invention show a marked increase or divergent behavior in the reduced viscosity above a concentration of about 5 percent.

While not being bound by any particular theory, it is believed that a critical micelle volume (CMV) occurs in the base oils. At this volume, the divergent viscosity behavior evident in FIG. 1 is observed (at about five weight percent of the block copolymer in FIG. 1). This level will be dependent on the molecular weight of the copolymer as well as the copolymer composition. It is presumed the amphiphilic nature of the block copolymers will lead to aggregate structures such as micelles containing an oil-insoluble core and oil-soluble corona.

As can be seen in FIG. 1 the reduced viscosity of the block copolymer in an oil solution increases linearly with concentration up to 5 percent where the reduced viscosity diverges. The concentration of block copolymer is proportional to the volume fraction occupied by the polymer in solution. It is presumed the resultant volume fraction will increase with the increasing temperature of the oil due to the enhanced solution of the polymer chains. The volume fraction increase effect on viscosity is not as significant in the linear region, as compared to the in the divergent region where the behavior is pronounced. From this data, we can presume large viscosity effects (i.e, enhanced VI) can be more readily obtained above a specified volume fraction limit (i.e., divergent point) or critical volume fraction (CVF) value. Also depicted on the graph are points for a homopolymer of dodecyl methacrylate (DDMA) of similar molecular weight (44,000 g/mol) at 40 and 100° C. It is clear the divergent behavior is not observed in the homopolymer.

The oil composition of the invention is useful in applications including hydraulic and transmission fluids, gear and motor oils, and oil-based cosmetics and personal care formulations. Oil-based cosmetic and personal care formulations benefiting from the thickening imparted by the acrylic block copolymer of the present invention include, for example, toiletries, cleansers, lipsticks, deodorant sticks, nail varnishes, creams, gels and oils, sun creams protective hand creams, night renewal creams, body milks and lotions, light facial creams, protective day creams, liquid moisturizing emulsions, oil-in-water creams and water-in-oil creams, as well as products for the removal of cosmetic, makeup or personal care products.

The oil compositions of the invention also include oil-based paints, inks, and formulations of pharmaceutical actives.

EXAMPLES

The controlled architecture block copolymers were synthesized using the following generic protocol. Molecular weights were targeted by manipulating the monomer to initiator concentration ([M]/[I]). Therefore a targeted molecular weight could be achieved by setting the [M]/[I] ratio, and then carrying out the polymerization to the desired conversion necessary to reach the target molecular weight. Monomer conversion was conveniently monitored by gas chromatography (GC) analysis or flash devolitization of the monomer under vacuum. The polymer examples were run neat or in solution. Typical solvents used included, toluene, ethyl benzene, and methyl ethyl ketone. Polymerizations were carried out at ambient pressures or run under nitrogen pressure up to 60 psi. Polymerizations were run in standard polymerization vessels both with and without shearing capacity, although adequate mixing capabilities were preferred.

The target block copolymers were prepared by various traditional monomer addition and polymer isolation protocols, as generically described below and will be evident to those skilled in the art, dependant on the desired final block composition. For example, pure block copolymers were prepared by evaporating the residual monomer upon completion of the first block synthesis, followed by the addition of a second monomer composition different from the first This second monomer composition then undergoes polymerization. This procedure may be repeated to obtain multiblock copolymers. Gradient block copolymers were synthesized by polymerizing a mixture of two or more monomers. This mixture could result, for instance, by adding a second monomer to the initial polymerization medium prior to evaporation of the residual first monomer, or a multi-monomer mix could be polymerized as a first block, or a multi-monomer mix could be added to an isolated pure first block.

Synthesis of the copolymers of the invention is illustrated by reference to example 1 below. Other copolymers of this invention can be prepared in an analogous manner, as it will be evident to those skilled in the art.

Mono-alkoxyamine initiator

Bis-alkoxyamine initiator

Free nitroxide

Example 1

Polymer Synthesis

Example 1: Synthesis of an A-B block copolymer. The A block was polymethyl acrylate (PMA) and the B block was a gradient copolymer of polydodecyl methacrylate and polymethacrylate (PDDMA-co-PMA).

A mixture containing (11.4 grams, 30.0 mmol) monoalkoxyamine initiator, (0.441 grams, 1.5 mmol) free nitroxide, and (600 grams, 6.97 mol) of methyl acrylate was added to a stainless steel resin kettle under nitrogen ($\approx$40 psi), and heated to 110° C. under vigorous stirring. The temperature was maintained for approximately 3 hours, at which point the reaction had reached 50% conversion as measured by gas chromatography (GC). The reaction mixture was then cooled to room temperature. The $M_w$ (weight average molecular weight)=12,600 g/mol, and $M_n$ (number average molecular weight)=10,300 g/mol as determined by size exclusion chromatography (SEC) analysis and referenced to polystyrene standards. In a glass reactor equipped with a condenser, 40.5 grams (159.4 mmol) of dodecyl methacrylate was heated to 100° C. under a nitrogen atmosphere and vigorous stirring. To 25.3 grams of the PMA polymer and monomer mixture from above, 2.18 grams (25.3 mmol) of methyl acrylate was added. The resultant polymer mixture (12.65 grams of PMA and 14.83 grams of methyl acrylate) was added to the DDMA monomer over 1 minute. The resulting mixture was cloudy as the PMA was not completely soluble in the dodecyl methacrylate and methyl acrylate monomer solution. The temperature was held at 100-105° C. and the cloudy mixture became clear in the first 30 minutes, indicating the formation of a block copolymer was occurring as the resultant block acted as a stabilizer for the corresponding mixture. The reaction was run until approximately 60% monomer conversion was achieved as monitored by GC. The reaction took several hours when an acrylate monomer was present, however if only a methacrylate was present the polymerization was generally done in less than 1 hour. The resultant viscous liquid was diluted by an equal volume of THF, and the solution was precipitated into cold stirring methanol. The Mw=56,500 g/mol, and Mn=39,600 g/mol as determined by SEC analysis as compared to polystyrene standards.

Example 1-1

PMA-b-PDDMA

An analogous A-B block copolymer was prepared in which the A block was polymethyl acrylate (PMA) and the B block was a pure block of polydodecyl methacrylate (PDDMA). The residual monomer from the first block PMA from example 1 was removed. The neat PMA was then dissolved in toluene (approximately equal weight) prior to adding to the heated lauryl methacylate monomer solution. This protocol resulted in a pure block copolymer of PMA and PDDMA.

Examples 1-A to 1-P

The following polymers were prepared in accordance with the procedures given above for Example 1 and 1-1. Homopolymers and diblocks were synthesized with the monoalkoxyamine initiator, while triblocks were synthesized with the difunctional alkoxyamine initiator. Mn and PDI values listed are based on SEC analysis as compared to polystyrene standards and the relative wt % of monomers listed are based on conversions by GC or $^1$H NMR analysis.

For the following examples, "co-" will represent a copolymer, and "b-" will represent a block.

Example 1-A (Comparative): Polyethtylhexyl acrylate (PEHA) homopolymer, Mn=26 kg/mol and PDI=1.4.

Example 1-B (Comparative): PEHA-co-polystyrene (PS), Mn=49.5 kg/mol, PDI=1.5, and PS=50 wt %.

Example 1-C: Polydodecyl methacrylate (PDDMA)-b-PS, 28.0 kg/mol, PDI=1.6, and PS=16 wt %.

Example 1-D: PDDMA-b-PS-b-PDDMA, 31.6 kg/mol, PDI=1.7, and PS=35 wt %.

Example 1-E: PDDMA-co-PS-b-PS-b-PS-co-PDDMA, 31.6 kg/mol, PDI=1.7, and PS=48 wt %.

Example 1-F: PDDMA-b-PMA-b-PDDMA, 23.0 kg/mol, PDI=1.5, and PMA=48 wt %.

Example 1-G: PDDMA-co-PEHA-co-PS, 25.6 kg/mol, PDI=1.8, and PDDMA=64 wt %, PEHA=24 wt %.

Example 1-H: PDDMA-b-poly n-butylacrylate(PnBA)-b-PDDMA, 77.6 kg/mol, PDI=1.8, and PnBA=65 wt %.

Example 1-I: PDDMA-b-PMA-b-PDDMA, 76.0 kg/mol, PDI=2.0, and PMA=60 wgt %.

Example 1-J: Polymethoxy ethyl acylate (PMEA)-b-PDDMA.

Example 1-K: PDDMA-b-PMEA-b-PDDMA.

Example 1-L: polyethyl acrylate (PEA)-b-PDDMA.

Example 1-M: PDDMA-b-PEA-b-PDDMA.

Example 1-N: Polydimethyl acrylamide (PDMAA)-co-PEA-b-PDDMA.

Example 1-O: Polydimethyl amino ethyl acrylate (PDMAEA)-co-PEA-b-PDDMA.

Example 1-P: Poly(polyethylene glycol methoxy ether) acrylate (PEGME)-co-PEA-b-PDDMA.

Example 2

Testing of Polymers

Polymers 1A, 1B, 1C, 1D, 1H, and 1I of Example 1 were dissolved in a light paraffinic mineral oil (Base oil 1) at the listed percentages. Polymers 1E, 1F, and 1G of Example 1 were dissolved in a 150 NS group II base oil from TOTAL at the listed percentages. The viscosity of each lubricating oil composition was measured at both 40° C. and at 100° C. by ASTM standard D445. The resultant VI was calculated using ASTM D2270. The results are found in Table 1 below.

TABLE 1

| SAMPLE | WT % In Oil | 40° C. Visc. Cs | 100° C. Visc. Cs | VI |
|---|---|---|---|---|
| Base Oil 1 | — | 36 | 6.0 | 110.2 |
| Base Oil 2 | — | 31.5 | 5.3 | 101.2 |
| 1A | 5 | 43.9 | 7.3 | 128.7 |
| 1B | 5 | Not Soluble | Not Soluble | — |
| 1C | 5 | 58.7 | 9.2 | 137.5 |
| 1D | 5 | 51.9 | 9.2 | 159.8 |
| 1E | 5 | 49.3 | 8.8 | 158.1 |
| 1F | 5 | 62.9 | 10.7 | 160.2 |
| 1F | 7.5 | 96.6 | 18.1 | 207.8 |
| 1G | 5 | 43.1 | 7.0 | 121.5 |
| 1G | 10 | 81.3 | 12.8 | 157.4 |
| 1H | 2.5 | 50.4 | 8.7 | 149.3 |
| 1H | 5 | 89.1 | 16.0 | 192.3 |
| 1H | 10 | 267.2 | 49.0 | 245.2 |
| 1I | 5 | 45.9 | 9.5 | 197.7 |

As evident in Table 1, the random copolymer (comparative example) 1-B was not soluble in the base oil. The block copolymers are soluble in the base oil and the VI increases with increasing concentration of the polymer Example 3

Optimization of VI Improvement

Sixteen well-defined block copolymer compositions were synthesized by using either a mono alkoxyamine or a difunctional alkoxyamine. For the 16 compositions five variables were investigated; namely, the solubility of the insoluble segment or monomer composition (from slightly insoluble to highly insoluble in oil or PS versus PMA), wt % of the insoluble segment, total $M_n$ of the block copolymer, wt % gradient of insoluble component, and block architecture (diblock vs. triblock).

A summary of the results is depicted in Table 2 below.

The first column indicates the sample number. Columns 2-6 indicate the targeted experimental design parameters: Mn total, insoluble segment, weight percent insoluble block, gradient %, and block type (triblock (3) or diblock (2)). DDMA was used as the soluble segment in each polymer and the viscosity measurements were obtained on 5 wt % polymer solutions in 150NS group II base oil received from TOTAL.

TABLE 2

| Run | Mn total | Insoluble monomer | Wt % Insol. | Gradient % | Block Type | Mn Insol. kg/mol | Mn $2^{nd}$ | % DDMA NMR | Visc 40 C. cst | Visc 100 C. cst | VI |
|---|---|---|---|---|---|---|---|---|---|---|---|
| 1 | 50 | MA | 50 | 0 | 2 | 22.2 | 42.8 | 69 | 180.72 | 37.17 | 255 |
| 2 | 50 | MA | 20 | 0 | 3 | 12.3 | 35 | 78 | 213.23 | 40.43 | 244 |
| 3 | 50 | PS | 20 | 25 | 3 | 11.6 | 28.4 | 59 | 69.84 | 10.82 | 144 |
| 4 | 50 | PS | 50 | 25 | 2 | 21.2 | 28.9 | 49 | 105.12 | 17.6 | 181 |
| 5 | 20 | MA | 50 | 0 | 3 | 11 | 12 | 52 | 62.9 | 10.66 | 160 |
| 6 | 50 | PS | 50 | 0 | 3 | 24.8 | 21.1 | 56 | 61.27 | 10.88 | 171 |
| 7 | 50 | MA | 20 | 25 | 2 | 111 | 35.3 | 69 | 198.49 | 49.23 | 301 |
| 8 | 20 | PS | 50 | 0 | 2 | 9.2 | 8.8 | 43 | 46.69 | 7.71 | 133 |
| 9 | 50 | PS | 20 | 0 | 2 | 10 | 26.1 | 77 | 89.8 | 10.82 | 102 |
| 10 | 20 | MA | 20 | 25 | 3 | 4 | 18 | 73 | 47.93 | 8.2 | 145 |
| 11 | 20 | PS | 50 | 25 | 3 | 10.9 | 14.2 | 39 | 43.28 | 8.02 | 160 |
| 12 | 20 | PS | 20 | 25 | 2 | 4.5 | 23.5 | 60 | 53 | 8.63 | 139 |
| 13 | 20 | MA | 50 | 25 | 2 | 10.3 | 9.7 | 48 | 52.33 | 9.31 | 162 |
| 14 | 20 | PS | 20 | 0 | 3 | 5.5 | 14.3 | 68 | 46.9 | 7.76 | 134 |
| 15 | 20 | MA | 20 | 0 | 2 | 4.4 | 13.6 | 77 | 63.37 | 10.28 | 150 |
| 16 | 50 | MA | 50 | 25 | 3 | 24.9 | 28.1 | 58 | 97.4 | 20.86 | 241 |

Table 2 clearly shows the significant VI increase obtained by increasing the immiscibility of one block segment (from PS to PMA in sample 9 versus sample 7) and changing the molecular weight as in sample 10 versus sample 7.

Example 4

Starting with a multifunctional alkoxyamine (Formula I where n>2) and proceeding with the polymerization procedures described in example 1, star block copolymers were synthesized. The multifunctional, acrylates were formed by adding a slight molar excess (of amino-alkoxyamine to unsaturated groups in the multifunctional acrylate) of a monoalkoxyamine of Formula I where n=1, to a multifunctional acrylate at 60° C. for <1 hour (ethanol is used as a solvent). The monoalkoxyamine is chosen such that the dissociation temperature is <60° C.

Example 5

Sample number 7 and number 16 from Table 2 could be blended at 1 weight percent and at 5 weight percent in a typical base oil such as 100NS or 150NS base oil stock and would be expected to display excellent shear stability Example 5-A The polymerization of methyl acrylate was carried out directly in a paraffinic mineral oil, using a monoalkoxyamine and the standard polymerization conditions from example 1. After several hours, PDDMA was added to the polymerization mixture. The corresponding PMA-b-PMA-co-PDDMA polymer was left in the oil solution Example 5-B The solution from Example 5-A was diluted with a 150NS base oil from TOTAL and used directly as a VII.

Example 5-C

The polymerization mixture obtained in Example 5-A was treated with a traditional free radical initiator, to react or (chase) the residual DDMA and MA monomers.

Example 5-D

The solution from 5-C was diluted with a 150NS base oil from TOTAL and used as a VII.

Example 5-E

Example 1-N is added at 1% to a base oil from TOTAL and used as a dispersant

Example 5-F

Example 1-0 is added at 1% to a base oil from TOTAL and used as a dispersant.

Example 5-G sample 16 from Table 1 is added at 1% to an aviation hydraulic fluid and utilized as a VII with excellent shear stability.

Example 5-H sample 16 from Table 1 is added at 1% to a multigrade hydraulic fluid and utilized as a VII with excellent shear stability.

Example 6

Figure 2:
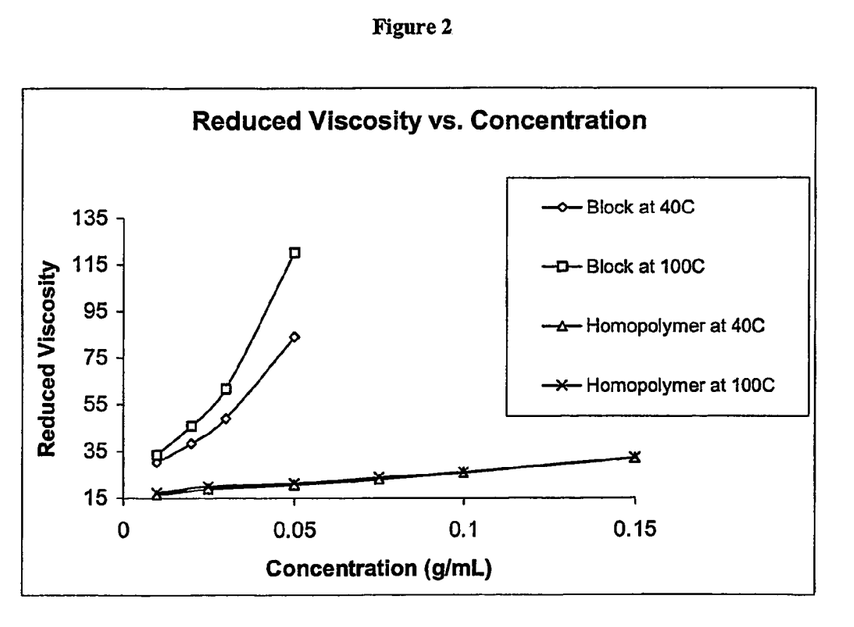
FIG. 2 is an analogous plot to FIG. 1, representing a block copolymer having about twice the Mn as compared to the block shown in FIG. 1.

Experiment that Yielded FIGS. 1 and 2

DDMA homopolymer was synthesized using a monoalkoxyamine and had an Mn=44.5 kg/mol and PDI=2.2. The block copolymer (PMA-b-PDDMA) had an Mn=23 kg/mol and PDI=1.6. The wt % PDDMA was 52%. The aforementioned block copolymer and PDDMA homopolymers were dissolved in a 150NS base oil supplied by TOTAL. The reduced viscosity of these solutions at various polymer concentrations were plotted at both 40 and 100° C. Evident from this plot is the unique behavior of the block copolymer as compared to the analogous homopolymer. Without being bound to any particular theory, it is believed the amphiphilic-nature of the acrylic block is responsible for the unique behavior demonstrated by FIG. 1. This behavior leads to the excellent VII behavior demonstrated by the block copolymer as compared to the corresponding homopolymer.

Example 7

Figure 3:
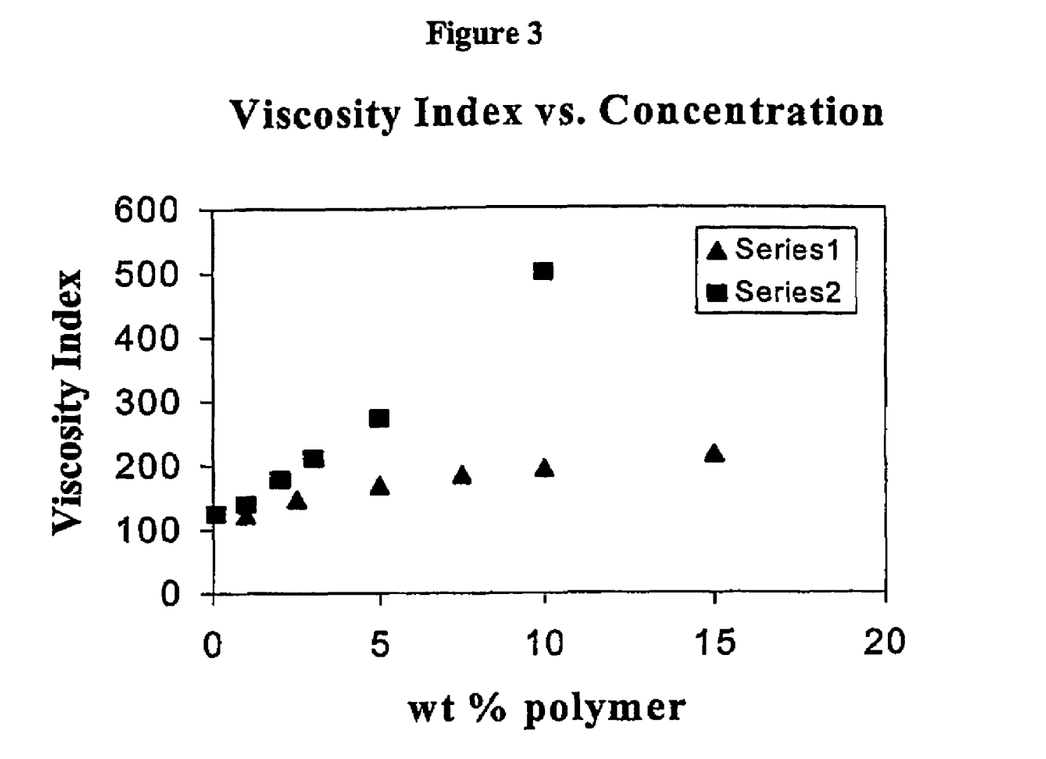
FIG. 3 graphically illustrates the VI versus the weight percentage of polymer incorporated in a lubricating oil composition containing comparative VIIs and VIIs of the invention. The plot indicates the VIIs of the invention provide similar VII behavior at much lower weight percentages as compared to the comparative VIIs.

The same experiment performed in Example 6 was repeated using a block copolymer having nearly twice the molecular weight (Mn 46.4 kg/mol, PDI=2.0 and 76.7 wt % PDDMA). The results are shown in FIG. 2. The divergent point was shifted to a much lower polymer concentration, due to the increased molecular weight and therefore increased volume fraction of the solution occupied by polymer. Again as the critical volume fraction or CVF is reached, a divergent behavior is observed. This CVF has a consequential affect on the VI, which is more pronounced in the block copolymer case than observed for simple homopolymers or random copolymers. The diblock reaches the divergence point at a lower concentration (approximately 3 wt %), and this in-turn has a strong influence on the resultant VI as can be seen in FIG. 3. FIG. 3 is a plot of VI vs. wt % polymer. As expected, there is a large increase in the VI as we increase the amount of block copolymer (series 2) in solution. The homopolymer (series 1) VI also increases with concentration, however it begins to level off at higher concentrations. The block copolymer shows a more aggressive behavior as the VI increases rapidly with increasing concentration and the increase is more pronounced at higher concentrations. This data indicates the significant cost/performance advantage of these types of block structures. This is clearly seen in FIG. 3 in which the VI for the 3 wt % block copolymer is equal to the VI for 15% homopolymer.

What is claimed is:
1. A thickened oil composition comprising
a) from 99.95 to 60 weight percent of one or more oils; and
b) from 0.05 to 40 weight percent of a block copolymer, having at least one acrylic block, synthesized by controlled radical polymerization.
2. The thickened oil composition of claim 1 comprising from 0.01 to 20 weight percent of said block copolymer.
3. The thickened oil composition of claim 1 wherein said oil composition is a lubricating oil composition.
4. The thickened oil composition of claim 1 wherein said block copolymer is an amphiphilic block copolymer.

5. The thickened oil of claim 4 wherein said amphiphilic block copolymer comprises:
   1) at least one oil-soluble polymer block having a solubility parameter of from 14 to 18 $(J/m^3)^{1/2}$; and
   2) at least one non-oil soluble polymer block having a solubility parameter of greater than 18 $(J/m^3)^{1/2}$.

6. The thickened oil composition of claim 5 wherein said non-oil soluble block has a solubitity parameter of greater than 20 $(J/m^3)^{1/2}$.

7. The thickened oil of claim 1 wherein said block copolymer is formed by a nitroxide-mediated, controlled radical polymerization process.

8. The thickened oil of claim 1 wherein said acrylic block polymer is formed from all acrylic monomers.

9. The thickened oil of claim 5 wherein said non-oil soluble polymer block comprises poly(methyl aerylate) or polystyrene.

10. The thickened oil composition of claim 1, wherein said block copolymer comprises micelles of block copolymers.

11. The thickened oil composition of claim 2 wherein said oil composition has a viscosity index of greater than 150.

12. The thickened oil composition of claim 9 wherein said viscosity index is greater than 200.

13. The thickened oil composition of claim 10 wherein said viscosity index is greater than 250.

14. The thickened oil of claim 1 wherein said oil composition comprises a hydraulic fluid, a transmission fluid, a gear oil, a motor oil, a cosmetic formulation, or a personal care formulation.

15. The thickened oil of claim 1 wherein said block copolymers comprise at least 90 mole percent of one or more acrylic monomers.

16. The thickened oil of claim 1 wherein said acrylic block comprises at least 95 mole percent of one or more acrylic monomers.

17. The thickened oil composition of claim 3 further comprising detergents, anti-foaming agents, and anti-corrosion agents.

18. The thickened oil composition of claim 1 wherein said block copolymer is multifunctional.

19. A thickened oil composition comprising
   a) from 99.95 to 60 weight percent of one or more oils; and
   b) from 0.05 to 40 weight percent of a block copolymer, having at least one block consisting essentially of acrylic monomers synthesized by controlled radical polymerization.

20. The thickened oil composition of claim 19 wherein said one block consisting essentially of acrylic monomers comprises at least 90 mole percent acrylic monomers.

21. The thickened oil composition of claim 19 wherein said oil composition is a lubricating oil composition.

22. The thickened oil composition of claim 19 wherein said block copolymer is an amphiphilic block copolymer.

23. The thickened oil of claim 22 wherein said amphiphilic block copolymer comprises:
   1) at least one oil-soluble polymer block having a solubility parameter of from 14 to 18 $(J/m^3)^{1/2}$; and
   2) at least one non-oil soluble polymer block having a solubility parameter of greater than 18 $(J/m^3)^{1/2}$.

24. The thickened oil composition of claim 23 wherein said non-oil soluble block has a solubility parameter of greater than 20 $(J/m^3)^{1/2}$.

25. The thickened oil of claim 19 wherein said block copolymer is formed by a nitroxide-mediated, controlled radical polymerization process.

26. The thickened oil of claim 19 wherein said one block consisting essentially of acrylic block polymer is formed from all acrylic monomers.

27. The thickened oil of claim 23 wherein said non-oil soluble polymer block comprises poly(methyl acrylate) or polystyrene.

28. The thickened oil composition of claim 19, wherein said block copolymer comprises micelles of block copolymers.

29. The thickened oil composition of claim 20 wherein said oil composition has a viscosity index of greater than 150.

30. The thickened oil composition of claim 27 wherein said viscosity index is greater than 200.

31. The thickened oil composition of claim 28 wherein said viscosity index is greater than 250.

32. The thickened oil of claim 19 wherein said oil composition comprises a hydraulic fluid, a transmission fluid, a gear oil, a motor oil, a cosmetic formulation, or a personal care formulation.

33. The thickened oil of claim 19 wherein said one block consisting essentially of acrylic monomers comprise at least 90 mole percent of one or more acrylic monomers.

34. The thickened oil composition of claim 19 further comprising detergents, anti-foaming agents, and anti-corrosion agents.

35. The thickened oil composition of claim 19 wherein said block copolymer is multifanctional.

36. The thickened oil of claim 19 wherein said one block consisting essentially of acrylic monomers comprises at least 95 mole percent of one or more acrylic monomers.

* * * * *